US011225148B2

(12) United States Patent
Nakazawa et al.

(10) Patent No.: US 11,225,148 B2
(45) Date of Patent: Jan. 18, 2022

(54) CONTROLLER FOR VEHICLE (71) Applicant: KABUSHIKI KAISHA TOYOTA CHUO KENKYUSHO, Nagakute (JP)

(72) Inventors: Teruhiko Nakazawa, Nagakute (JP); Ryoichi Hibino, Nagakute (JP); Hiroyuki Nishizawa, Nagakute (JP); Atsushi Kawaguchi, Nagakute (JP); Gentaro Yamanaka, Nagakute (JP); Yasushi Amano, Nagakute (JP); Masaru Sugai, Nagakute (JP); Yasuhiro Torii, Okazaki (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 215 days.

(21) Appl. No.: 16/194,882

(22) Filed: Nov. 19, 2018

(65) Prior Publication Data

US 2019/0176645 A1 Jun. 13, 2019

(30) Foreign Application Priority Data

Dec. 7, 2017 (JP) .............................. JP2017-234814

(51) Int. Cl.
| | |
|---|---|
| *B60L 15/20* | (2006.01) |
| *G05B 17/02* | (2006.01) |
| *B60K 17/04* | (2006.01) |
| *B60K 1/02* | (2006.01) |
| *B60K 17/02* | (2006.01) |
| *B60K 17/26* | (2006.01) |

(52) U.S. Cl.
CPC ................ *B60L 15/20* (2013.01); *B60K 1/02* (2013.01); *B60K 17/02* (2013.01); *B60K 17/04* (2013.01); *B60K 17/26* (2013.01); *G05B 17/02* (2013.01); *B60L 2240/423* (2013.01); *B60Y 2400/427* (2013.01); *B60Y 2400/73* (2013.01)

(58) Field of Classification Search
CPC ..... B60L 15/20; B60L 2240/423; B60K 1/02; B60K 17/02; B60K 17/26; B60K 17/04; G05B 17/02; B60Y 2400/73
See application file for complete search history.

(56) References Cited

U.S. PATENT DOCUMENTS

| | | | | |
|---|---|---|---|---|
| 5,335,537 | A * | 8/1994 | Shibayama ........... | G01M 13/02 |
| | | | | 73/115.06 |
| 5,956,465 | A * | 9/1999 | Takagi .............. | G05B 19/41815 |
| | | | | 700/255 |
| 2010/0250042 | A1 * | 9/2010 | Shamoto ............... | B60W 20/10 |
| | | | | 701/22 |
| 2017/0097055 | A1 * | 4/2017 | Shibata ................. | B60W 20/30 |
| 2019/0283612 | A1 * | 9/2019 | Morita ................. | B60K 7/0007 |

FOREIGN PATENT DOCUMENTS

JP      2007-68301 A     3/2007

\* cited by examiner

*Primary Examiner* — Fadey S. Jabr
*Assistant Examiner* — Omar K Morsy
(74) *Attorney, Agent, or Firm* — Oliff PLC (57) ABSTRACT

A target value obtaining section obtains a target value for the difference in rotational motion between a first motor and a second motor and a target value for output torque. A torque command value calculating section calculates a torque command value for the first motor and a torque command value for the second motor that achieve both of the target value for the difference in rotational motion and the target value for the output torque by using an inverse model of a motion model corresponding to a merging system.

8 Claims, 8 Drawing Sheets

| | |
|---|---|
| $T_h$ | ACCELERATOR POSITION |
| $T_{M1}$ | TORQUE OF THE FIRST MOTOR (TORQUE COMMAND VALUE) |
| $T_{M2}$ | TORQUE OF THE SECOND MOTOR (TORQUE COMMAND VALUE) |
| $T_C$ | OUTPUT TORQUE OF THE PLANETARY MECHANISM |
| $\Delta\theta$ | DIFFERENCE IN ROTATION ANGLE BETWEEN THE FIRST MOTOR AND THE SECOND MOTOR |
| $\Delta\dot{\theta}$ | DIFFERENCE IN ROTATIONAL ANGULAR VELOCITY BETWEEN THE FIRST MOTOR AND THE SECOND MOTOR |
| $\Delta\ddot{\theta}$ | DIFFERENCE IN ROTATIONAL ANGULAR ACCELERATION BETWEEN THE FIRST MOTOR AND THE SECOND MOTOR |
| $k_p$ | PROPORTIONAL GAIN |
| $k_i$ | INTEGRAL GAIN |

<VARIABLES AND PARAMETERS OF MOTION MODEL>

| | |
|---|---|
| $J_{M1}$ | MOMENT OF INERTIA ON THE AXIS OF THE FIRST MOTOR (UP TO THE FIRST SUN GEAR) |
| $J_{M2}$ | MOMENT OF INERTIA ON THE AXIS OF THE SECOND MOTOR (UP TO THE SECOND SUN GEAR) |
| $J_C$ | MOMENT OF INERTIA ON THE AXIS OF THE CARRIER OF THE PLANETARY MECHANISM (INCLUDING THE INERTIA OF THE VEHICLE) |
| $\lambda$ | PLANETARY GEAR RATIO OF THE PLANETARY MECHANISM |
| $\gamma_{M1}$ | REDUCTION RATIO IMMEDIATELY AFTER THE FIRST MOTOR |
| $\gamma_{M2}$ | REDUCTION RATIO IMMEDIATELY AFTER THE SECOND MOTOR |
| $\theta_{M1}$ | ROTATION ANGLE OF THE FIRST MOTOR |
| $\theta_{M2}$ | ROTATION ANGLE OF THE SECOND MOTOR |
| $\theta_C$ | ROTATION ANGLE OF THE CARRIER OF THE PLANETARY MECHANISM |
| $T_{M1}$ | TORQUE OF THE FIRST MOTOR |
| $T_{M2}$ | TORQUE OF THE SECOND MOTOR |
| $T_C$ | TORQUE OF THE CARRIER OF THE PLANETARY MECHANISM |
| $r$ | RADIUS OF TIRE DYNAMIC LOAD OF THE DRIVE WHEEL |
| $\Delta\theta$ | DIFFERENCE IN ROTATION ANGLE BETWEEN THE FIRST MOTOR AND THE SECOND MOTOR ON THE AXIS OF THE PLANETARY GEAR |

CONTROLLER FOR VEHICLE

CROSS REFERENCE TO RELATED APPLICATION

The entire disclosure of Japanese Patent Application No. 2017-234814 filed on Dec. 7, 2017 including the specification, claims, drawings, and abstract is incorporated herein by reference in its entirety.

TECHNICAL FIELD

The present disclosure relates to a controller for a vehicle and, in particular, to a controller for controlling a vehicle in which the torques from two motors are merged (combined) through a planetary mechanism.

BACKGROUND

Vehicles in which the torques from two motors are merged through a planetary mechanism to obtain driving force are known. For example, JP 2007-68301 A discloses an electrically powered vehicle in which the torque obtained from two motors is transmitted to a single vehicle drive shaft via a planetary gear mechanism, and also discloses a controller for such an electrically powered vehicle. JP 2007-68301 A discloses a controller for an electrically powered vehicle that controls the torque of one of the two motors to a predetermined torque (torque control) and controls the revolutions per minute (rpm) of the other motor (rpm control).

SUMMARY

Technical Problem

When, for example, as disclosed in JP 2007-68301 A, one of two motors is torque-controlled and the other motor is rpm-controlled, an attempt to change the difference in rpm between the two motors may cause a significant fluctuation in the torque obtained from the rpm-controlled motor, and this fluctuation may affect the output torque. If the output torque fluctuates from a control target value, for example, this unintended fluctuation in the output torque may give the driver of the vehicle a sensation that something wrong is happening.

The present disclosure is directed toward controlling a vehicle that obtains the output torque by merging the torques from two motors through a planetary mechanism so as to achieve both of the target value for the difference in rotational motion between the two motors and the target value for the output torque.

Solution to Problem

According to a specific example of the present disclosure, there is provided a controller for a vehicle, the controller being configured to control a vehicle that includes a merging system for merging torque from a first motor with torque from a second motor through a planetary mechanism to obtain output torque, the controller comprising a target value obtaining section configured to obtain a target value for a difference in rotational motion between the first motor and the second motor and a target value for the output torque; and a command value calculating section configured to calculate a torque command value for the first motor and a torque command value for the second motor that achieve both of the target value for the difference in rotational motion and the target value for the output torque by using an inverse model of a motion model corresponding to the merging system.

In this specific example, the planetary mechanism combines the torque from the two motors. For example, the torque obtained from the first motor and the torque obtained from the second motor are added together through the planetary mechanism to produce output torque corresponding to the result of this addition. The difference in rotational motion in the above-described specific example is a control amount that is obtained by comparing the rotational motion of the first motor and the second motor. Specific examples of the difference in rotational motion include, for example, the difference in rotational angular velocity or the difference in rotational angular acceleration.

In the above-described specific example, the inverse model of the motion model corresponding to the merging system that merges the torque from the first motor with the torque from the second motor through the planetary mechanism is used to obtain the output torque, thereby calculating the torque command value for the first motor and the torque command value for the second motor that achieve both of the target value for the difference in rotational motion and the target value for the output torque. The first motor and the second motor are controlled in this manner, for example, based on the torque command values that are calculated according to the above-described specific example.

As described above, according to the above-described specific example, control is performed so as to achieve both of the target value for the difference in rotational motion between the two motors and the target value for the output torque. For example, while the target value for the difference in rotational motion between the two motors and the target value for the output torque do not interfere with each other, control can be performed so as to follow both of these two target values.

Further, for example, the motion model may be obtained from one or more equations of motion corresponding to motion in the merging system.

Further, for example, the motion model may be a motion model for obtaining the difference in rotational motion and the output torque from the torque of the first motor and the torque of the second motor.

Further, for example, the command value calculating section may calculate the two torque command values for the first motor and the second motor through an arithmetic operation using an inverse matrix of a matrix corresponding to the motion model, from the two target values for the difference in rotational motion and the output torque.

Further, for example, an actual measurement value for the difference in rotational motion may be fed back to calculate the two torque command values for the first motor and the second motor, so that the controller can control the actual measurement value for the difference in rotational motion to follow the target value.

Advantageous Effects of Invention

According to the present disclosure, a vehicle that obtains the output torque by merging the torques from two motors through a planetary mechanism is controlled so as to achieve both of the target value for the difference in rotational motion between the two motors and the target value for the output torque. For example, according to the specific example of the present disclosure, while the target value for the difference in rotational motion between the two motors and the target value for the output torque do not interfere with each other, control can be performed so as to follow both of these two target values.

BRIEF DESCRIPTION OF DRAWINGS

Embodiments of the present disclosure will be described by reference to the following figures, wherein.

DESCRIPTION OF EMBODIMENTS

Figure 1:
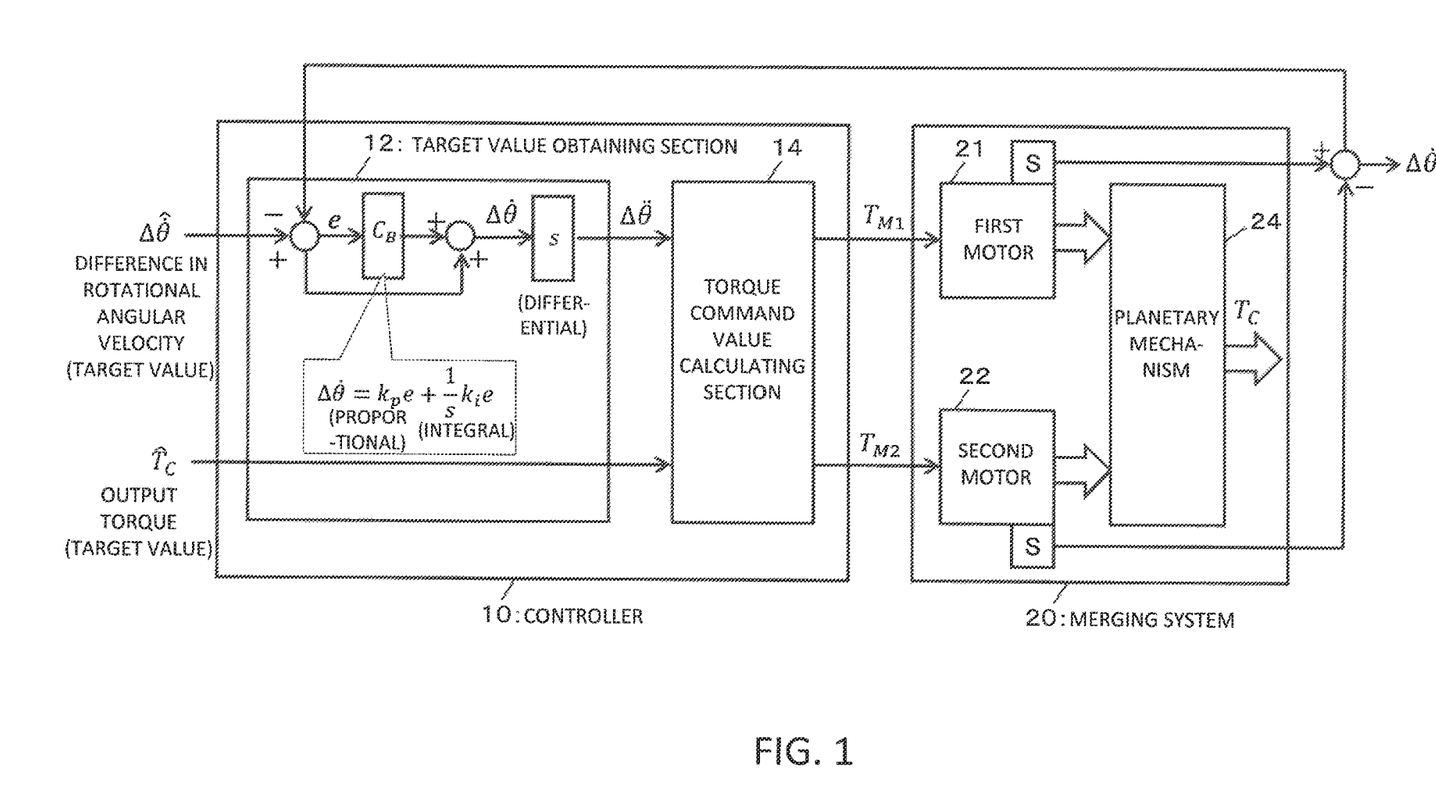
FIG. 1 illustrates a specific example of a vehicle that includes a controller 10.

FIG. 1 illustrates an example according to a specific embodiment of the present disclosure. FIG. 1 illustrates a specific example of a vehicle that includes a controller 10. In the specific example illustrated in FIG. 1, in addition to the controller 10, the vehicle includes a merging system 20 that is composed of a first motor 21, a second motor 22, and a planetary mechanism 24. The vehicle obtains its driving force (output torque) by merging the power (torques) obtained from two motors (electric motors), namely the first motor 21 and the second motor 22, through the planetary mechanism 24.

The controller 10 for a vehicle illustrated in FIG. 1 includes a target value obtaining section 12 and a torque command value calculating section 14. The target value obtaining section 12 obtains a target value for the difference in rotational motion between the first motor 21 and the second motor 22 and a target value for the output torque. In the specific example illustrated in FIG. 1, a target value for the difference in rotational angular velocity between the first motor 21 and the second motor 22 is obtained as the target value for the difference in rotational motion. The target value for the difference in rotational angular velocity is determined in accordance with, for example, motor efficiency or driving conditions of the vehicle. The target value for the output torque is determined in accordance with, for example, the position of the accelerator that is operated by the driver of the vehicle.

The torque command value calculating section 14 calculates a torque command value for the first motor 21 and a torque command value for the second motor 22 that achieve both of the target value for the difference in rotational motion and the target value for the output torque by using an inverse model of a motion model corresponding to the merging system 20.

Figure 2:
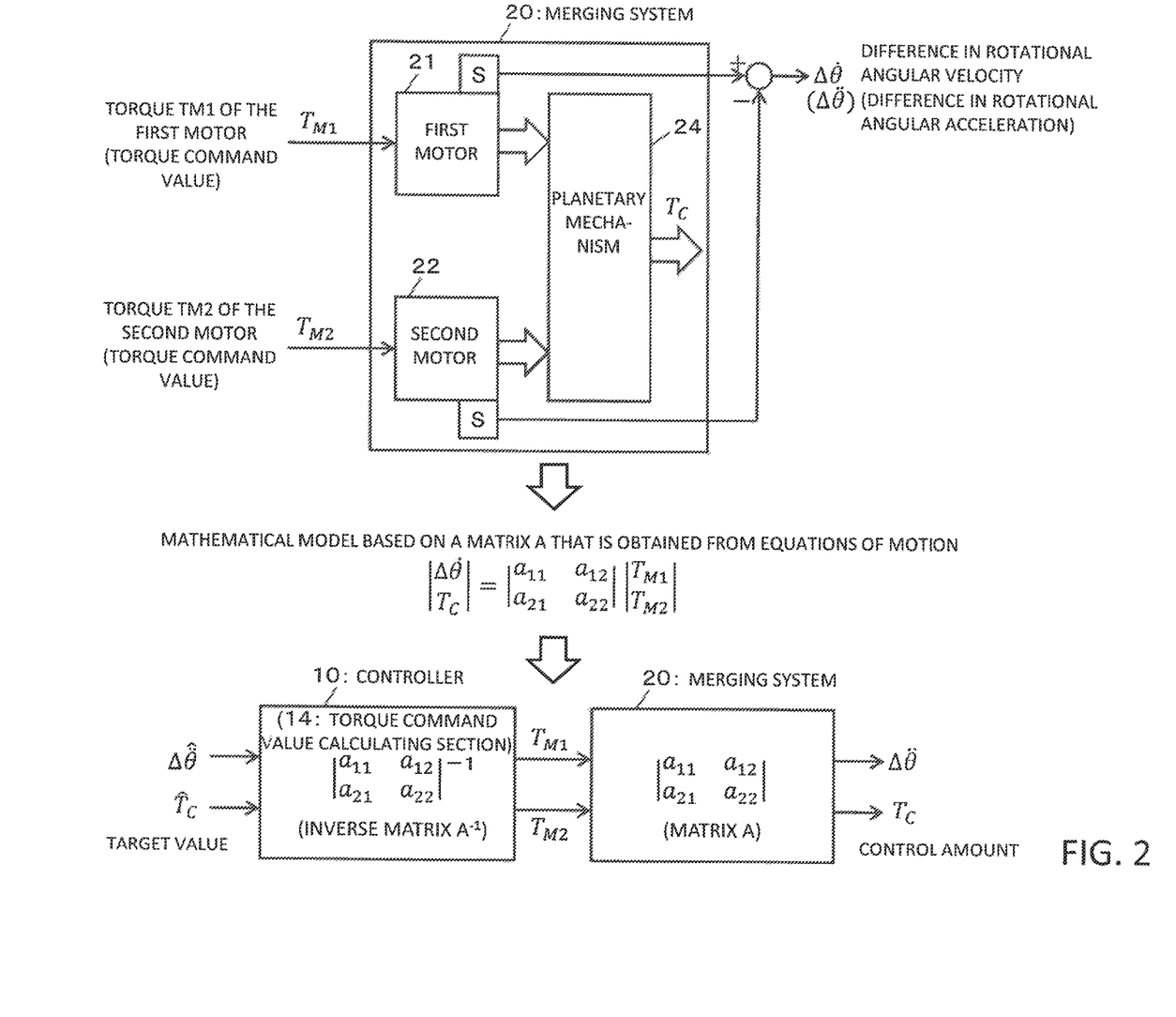
FIG. 2 illustrates a specific example of a motion model and its inverse model for a merging system.
Figure 3:
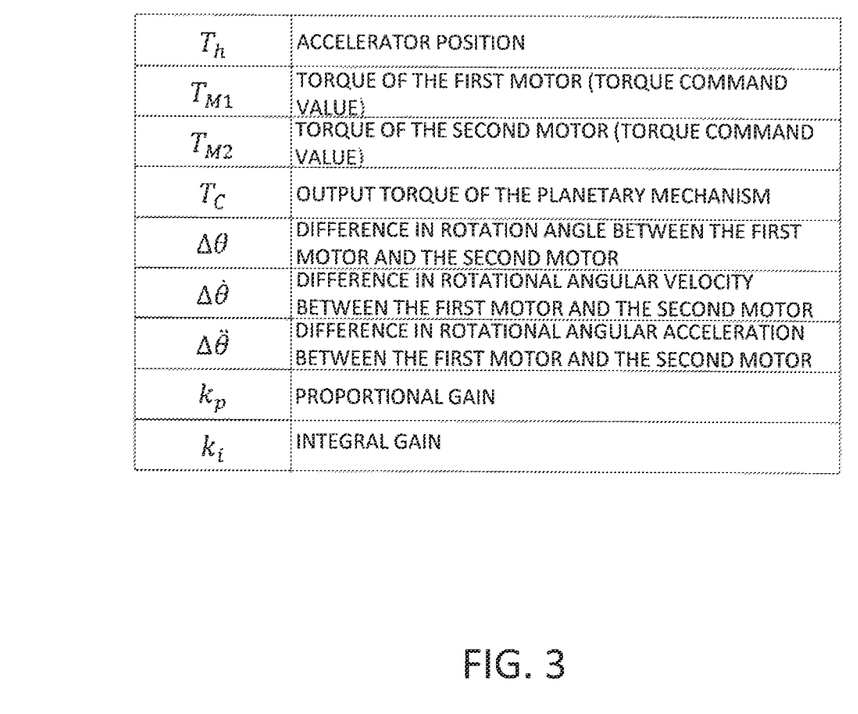
FIG. 3 lists definitions of symbols in FIGS. 1 and 2.

FIG. 2 illustrates a specific example of a motion model and its inverse model for the merging system 20. For definitions of symbols in FIGS. 1 and 2, see FIG. 3.

In the specific example illustrated in FIG. 2, a mathematical model based on a matrix A that is obtained from equations of motion corresponding to the motion in the merging system 20 is used as the motion model. In other words, there is used a mathematical model for obtaining the difference in rotational motion (difference in rotational angular velocity or difference in rotational angular acceleration) between the first motor 21 and the second motor 22 and the output torque through an arithmetic operation using the matrix A, from the torque of the first motor 21 and the torque of the second motor 22.

In the specific example illustrated in FIG. 2, a mathematical model based on an inverse matrix $A^{-1}$ of the matrix A is used as the inverse model of the motion model. In other words, the torque command value calculating section 14 of the controller 10 calculates a torque command value for the first motor 21 and a torque command value for the second motor 22 through an arithmetic operation using the inverse matrix $A^{-1}$, from the target value for the difference in rotational motion (difference in rotational angular velocity or difference in rotational angular acceleration) and the target value for the output torque.

As described above, in the specific example illustrated in FIG. 2, the controller 10 calculates the torque command value for the first motor 21 and the torque command value for the second motor 22 through an arithmetic operation using the inverse matrix $A^{-1}$, from the target value for the difference in rotational motion and the target value for the output torque. The torque of the first motor 21 and the torque of the second motor 22 are controlled based on the two calculated torque command values. The merging system 20 then obtains the difference in rotational motion and the output torque according to the motion model corresponding to the matrix A from the torque of the first motor 21 and the torque of the second motor 22. As the result obtained by multiplying the matrix A by the inverse matrix $A^{-1}$ is a unit matrix, the difference in rotational motion and the output torque, which are control amounts obtained from the merging system 20, are, in theory, equal to their respective target values.

In the specific example illustrated in FIG. 1, an actual measurement value for the difference in rotational motion is fed back to calculate two torque command values for the first motor 21 and the second motor 22, so as to control the actual measurement value for the difference in rotational motion to follow the target value. For example, the difference in rotational angular velocity (actual measurement value), which is a difference between two rotational angular velocities (actual measurement values) that are obtained from a sensor S attached to the first motor 21 and a sensor S attached to the second motor 22, is fed back to the controller 10.

The target value obtaining section 12 then executes a PI (proportional-integral) operation with respect to a difference e between the target value and the actual measurement value for the difference in rotational angular velocity using proportional gain $k_p$ and integral gain $k_i$ and, with respect to the result, executes a differential operation to obtain a difference in rotational angular acceleration (target value). The difference in rotational angular acceleration obtained in this manner is input to the torque command value calculating section 14.

The controller 10 may be implemented using, for example, hardware such as a CPU or a processor. For example, the target value obtaining section 12 and the torque command value calculating section 14 are implemented by an arithmetic operation device such as a CPU or a processor. The controller 10 may be implemented by means of memory or other devices, or electrical and electronic circuits, as appropriate.

The motion model (for example, the specific example illustrated in FIG. 2) corresponding to the merging system 20 is determined in accordance with the structure of the planetary mechanism 24. In the specific example illustrated in FIG. 1, different structures (or types) of the planetary mechanism 24 may be used. Here, a typical example structure of the planetary mechanism 24 will be described below. The specific example of the planetary mechanism 24 illustrated in FIG. 1 is not limited to this typical example structure.

Figure 4:
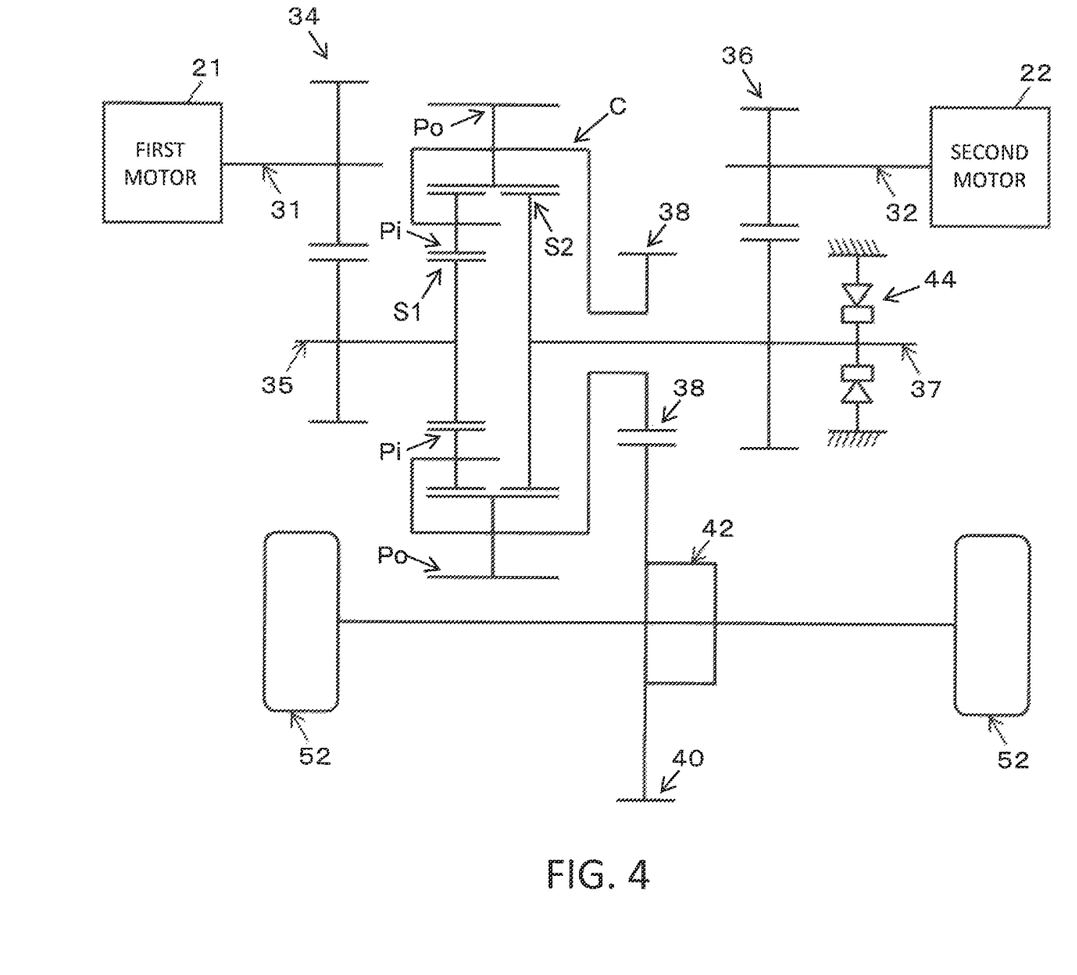
FIG. 4 illustrates an example structure of a planetary mechanism.

FIG. 4 illustrates an example structure of the planetary mechanism 24. The planetary mechanism 24 illustrated in FIG. 4 includes a first sun gear S1, to which the first motor 21 is connected, and a second sun gear S2, to which the second motor 22 is connected. More specifically, an output shaft 31 of the first motor 21 is connected via an input gear pair 34 to an input shaft 35 of the first sun gear S1, and an output shaft 32 of the second motor 22 is connected via an input gear pair 36 to an input shaft 37 of the second sun gear S2.

The transmission system from the second motor 22 to the second sun gear S2 includes a one-way clutch 44 on the input shaft 37 as a specific example of a clutch element that allows the second sun gear S2 to rotate when the vehicle moves forward and prevents rotation in the backward direction.

The planetary mechanism 24 illustrated in FIG. 4 includes a plurality of inner pinions (inner planetary pinions) Pi that are engaged with the first sun gear S1 and a plurality of outer pinions (outer planetary pinions) Po that are engaged with the second sun gear S2. Each of the outer pinions Po and a corresponding one of the inner pinions Pi are also in engagement with each other. The planetary mechanism 24 of the example structure illustrated in FIG. 4 further includes a carrier (planetary carrier) C that rotatably supports the plurality of outer pinions Po and the plurality of inner pinions Pi.

Three elements of the planetary mechanism 24 illustrated in FIG. 4, namely the first sun gear S1, the second sun gear S2, and the carrier C, rotate about the same axis of rotation. In the example structure illustrated in FIG. 4, the first sun gear S1 and the second sun gear S2 serve as two input elements, and the ratio of the number of teeth $Z_{S1}$ of the first sun gear S1 and the number of teeth $Z_{S2}$ of the second sun gear S2, $(Z_{S1}/Z_{S2})$, is the planetary gear ratio $\lambda$ $(\lambda=Z_{S1}/Z_{S2})$. The carrier C serving as an output element includes an output gear 38, and the output gear 38 is connected via a driven gear 40 and a final reduction gear 42 to a drive wheel 52.

Figure 5:
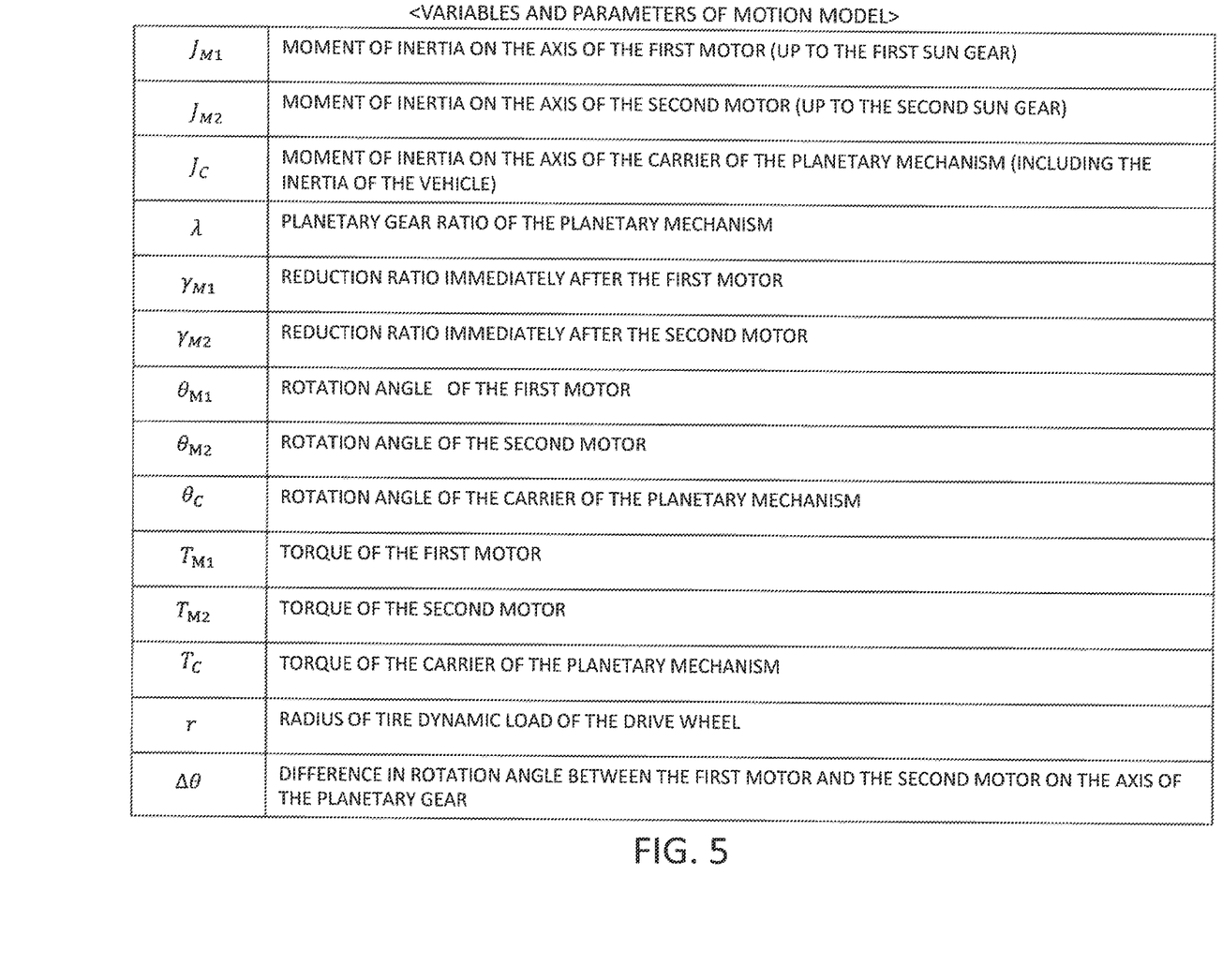
FIG. 5 lists variables and parameters for the motion model.

For variables and parameters in the motion model corresponding to the merging system 20 including the planetary mechanism 24 illustrated in FIG. 4, see FIG. 5. Here, a specific example of a mathematical model obtained from the equations of motion corresponding to the motion in the merging system 20 will be described below using the variables and parameters of the motion model listed in FIG. 5.

In the merging system 20 including the planetary mechanism 24 illustrated in FIG. 4, the following equations of motion hold for the rotational motion on the axis of the first motor 21, the rotational motion on the axis of the second motor 22, and the rotational motion on the axis of the carrier C.

Rotational motion on the axis of the first motor:

$$J_{M1}\ddot{\theta}_{M1} = T_{M1} - \frac{\lambda}{\gamma_{M1}(1+\lambda)}T_C \quad (1)$$

Rotational motion on the axis of the second motor:

$$J_{M2}\ddot{\theta}_{M2} = T_{M2} - \frac{1}{\gamma_{M2}(1+\lambda)}T_C \quad (2)$$

Rotational motion on the axis of the carrier:

$$J_C\ddot{\theta}_C = T_C \quad (3)$$

The following rpm constraint holds for the relationship between the rotational angular velocity of the first motor 21 and the rotational angular velocity of the second motor 22.

$$\frac{1}{\gamma_{M1}}\dot{\theta}_{M1} + \frac{\lambda}{\gamma_{M2}}\dot{\theta}_{M2} = (1+\lambda)\dot{\theta}_C \quad (4)$$

The motion model represented by the following equation (5) is calculated from the equations of motion (1), (2), and (3) and the rpm constraint (4). The motion model represented by the following equation (5) is a mathematical model for obtaining the difference in rotational angular acceleration between the first motor 21 and the second motor 22 on the axis of the planetary gear and the output torque through an arithmetic operation using the matrix A, from the torque of the first motor 21 and the torque of the second motor 22.

$$\begin{bmatrix} \ddot{\theta}_{M1}/\gamma_{M1} - \ddot{\theta}_{M2}/\gamma_{M2} \\ T_C \end{bmatrix} = \begin{bmatrix} a_{11} & a_{12} \\ a_{21} & a_{22} \end{bmatrix}\begin{bmatrix} T_{M1} \\ T_{M2} \end{bmatrix} \quad (5)$$

(Matrix A)

where $a_{11} = \beta_1(1+\lambda)\{J_C + J_{M2}(1+\lambda)\gamma_{M2}^2\}$ $a_{12} = -\beta_2(1+\lambda)\{\lambda J_C + J_{M1}(1+\lambda)\gamma_{M1}^2\}$ $a_{21} = -\beta_2\gamma_{M1}\gamma_{M2}\lambda(1+\lambda)J_C J_{M2}$ $a_{22} = \beta_1\gamma_{M1}\gamma_{M2}(1+\lambda)J_C J_{M2}$ $\beta_1 = \dfrac{\gamma_{M1}}{J_C J_{M2}\lambda^2\gamma_{M2}^2 + J_{M1}\gamma_{M1}^2(J_C + J_{M2}(1+\lambda)^2\gamma_{M2}^2)}$ $\beta_2 = \dfrac{\gamma_{M2}}{J_C J_{M2}\lambda^2\gamma_{M2}^2 + J_{M1}\gamma_{M1}^2(J_C + J_{M2}(1+\lambda)^2\gamma_{M2}^2)}$ Further, if it is assumed that the inverse matrix $A^{-1}$ of the matrix A is a matrix B, elements that are included in the matrix B are as follows:

$$\begin{bmatrix} b_{11} & b_{12} \\ b_{21} & b_{22} \end{bmatrix} = \begin{bmatrix} a_{11} & a_{12} \\ a_{21} & a_{22} \end{bmatrix}^{-1} \quad (6)$$

(Matrix B)  (Inverse Matrix $A^{-1}$)

where $b_{11} = \dfrac{J_{M1}\gamma_{M1}}{1+\lambda}$ $b_{12} = \dfrac{\lambda J_C + J_{M1}(1+\lambda)\gamma_{M1}^2}{J_C(1+\lambda)\gamma_{M1}}$ -continued $$b_{21} = -\frac{J_{M2}\gamma_{M2}\lambda}{1+\lambda}$$

$$b_{22} = \frac{J_C + J_{M2}(1+\lambda)\gamma_{M2}^2}{J_C(1+\lambda)\gamma_{M2}}$$

The torque command value calculating section 14 in FIG. 1 calculates the torque command value for the first motor 21 and the torque command value for the second motor 22 through an arithmetic operation in which the inverse matrix $A^{-1}$ (matrix B) represented by, for example, equation (6) is used, from the target value for the difference in rotational motion (difference in rotational angular acceleration) and the target value for the output torque.

Figure 6:
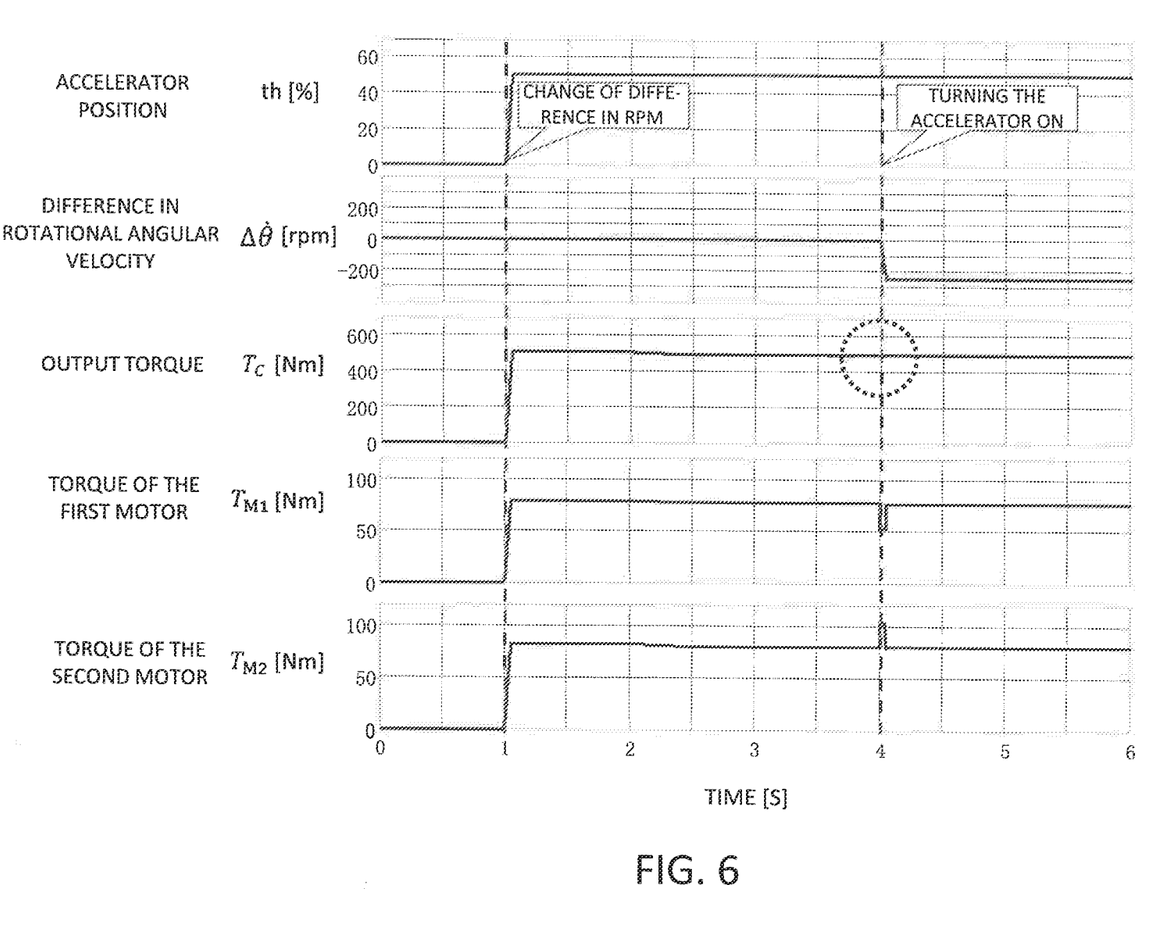
FIG. 6 illustrates a specific example of the results of control that is performed by the controller 10 illustrated in FIG. 1.

FIG. 6 illustrates a specific example of the results of control that is performed by the controller 10 for a vehicle illustrated in FIG. 1. FIG. 6 illustrates waveforms that represent changes over time for the accelerator position, the difference in rotational angular velocity, the output torque, the torque of the first motor, and the torque of the second motor.

In the specific example illustrated in FIG. 6, at time one second, the accelerator position sharply changes from 0% to about 50% in response to the operation of the accelerator (turning the accelerator on). To follow this change, the torque of the first motor and the torque of the second motor are then increased, and, as a result, the output torque is increased quickly so as to follow the operation of the accelerator.

In the specific example illustrated in FIG. 6, at time four seconds, the difference in rotational angular velocity between the first motor 21 and the second motor 22 is changed from 0 rpm to −250 rpm. At this change, or, in other words, at time four seconds, the output torque remains at the target value and is not affected by the change in the difference in rotational angular velocity, as can be seen in a circle drawn by a broken line in FIG. 6.

Figure 7:
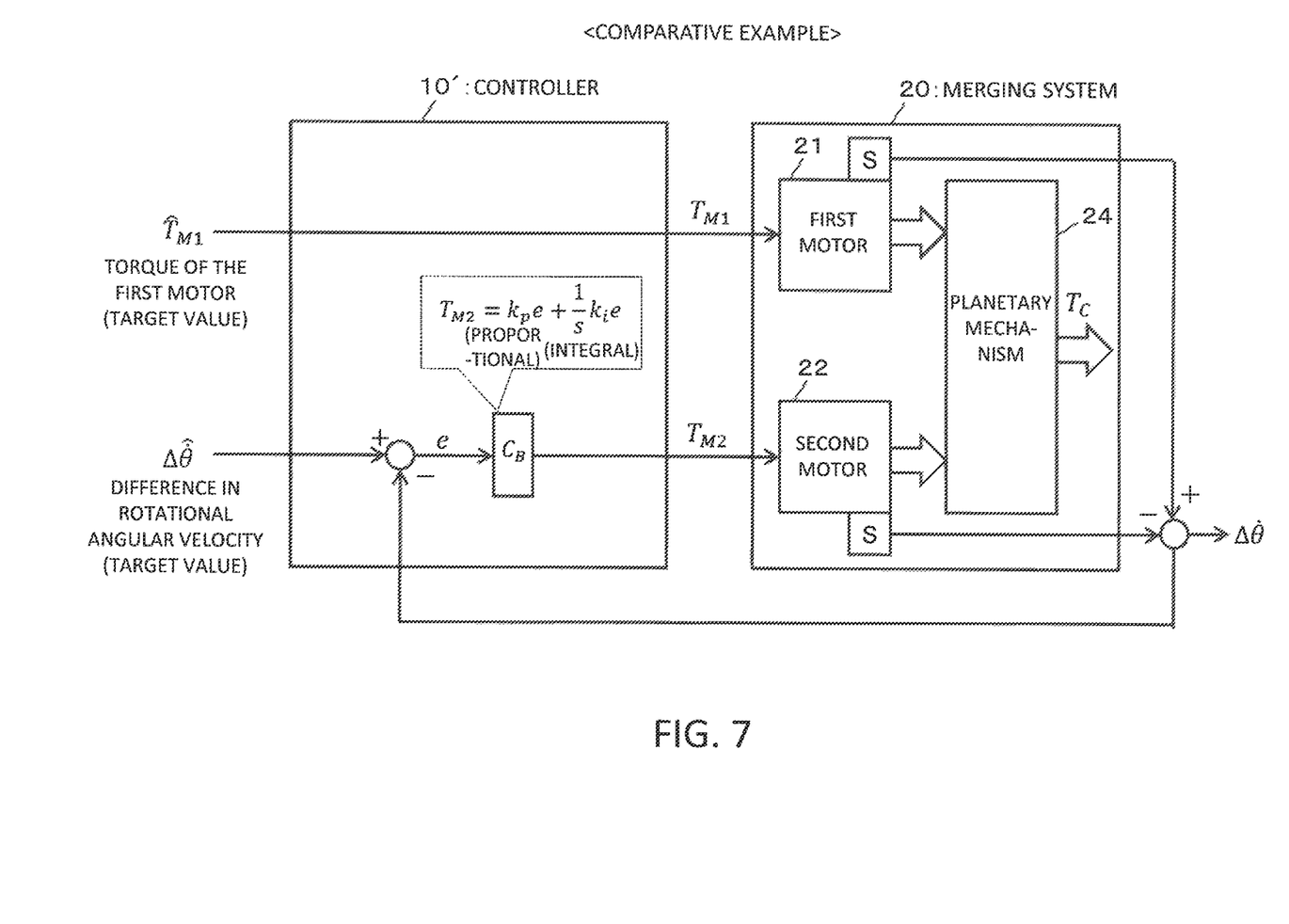
FIG. 7 illustrates a controller according to a comparative example.

FIG. 7 illustrates a controller according to a comparative example. FIG. 7 illustrates a controller 10' that controls the torque of the first motor 21 to a target value (torque control) and controls the second motor 22 in accordance with the target value for the difference in rotational angular velocity (rpm control).

In the comparative example illustrated in FIG. 7, the difference in rotational angular velocity (actual measurement value), which is a difference between two rotational angular velocities that are obtained from a sensor S attached to the first motor 21 and a sensor S attached to the second motor 22, is fed back to the controller 10'. A PI (proportional-integral) operation is then executed with respect to a difference e between the target value and the actual measurement value for the difference in rotational angular velocity using proportional gain $k_p$ and integral gain $k_i$ and, based on the torque command value thereby obtained, the second motor 22 is controlled. The first motor 21 is controlled based on the torque command value (target value) corresponding to the first motor 21.

Figure 8:
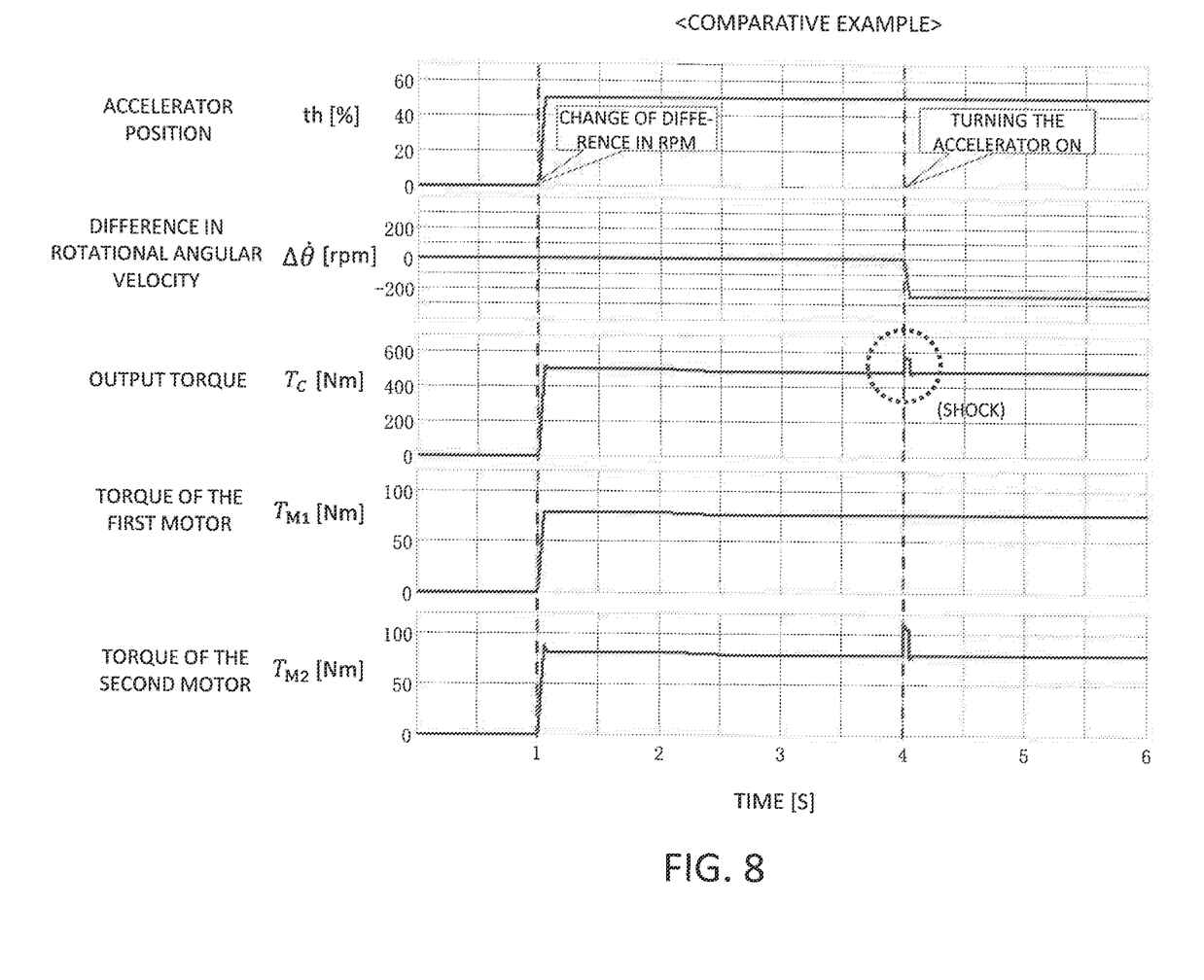
FIG. 8 illustrates the results of control according to the comparative example illustrated in FIG. 7.

FIG. 8 illustrates the results of control according to the comparative example illustrated in FIG. 7. FIG. 8 illustrates waveforms that represent changes over time for the accelerator position, the difference in rotational angular velocity, the output torque, the torque of the first motor, and the torque of the second motor.

In the comparative example illustrated in FIG. 8, at time one second, the accelerator position sharply changes from 0% to about 50% in response to the operation of the accelerator (turning the accelerator on). To follow this change, the torque of the first motor and the torque of the second motor are then increased, and, as a result, the output torque is increased quickly so as to follow the operation of the accelerator.

In the comparative example illustrated in FIG. 8, at time four seconds, the difference in rotational angular velocity between the first motor 21 and the second motor 22 is changed from 0 rpm to −250 rpm. At this change, or, in other words, at time four seconds, the torque of the rpm-controlled second motor 22 changes significantly, and this change affects the output torque and causes the output torque to deviate from the target value (occurrence of shock), as can be seen in a circle drawn by a broken line in FIG. 8.

As described above, in the comparative example illustrated in FIG. 8, while the first motor 21 is torque-controlled, the second motor 22 is rpm-controlled, and as such, the torque from the two motors cannot be coordinated so that they work together properly. Therefore, the output torque is affected by the change in the difference in rotational angular velocity.

In contrast, the controller 10 illustrated in FIG. 1 controls each of the first motor 21 and the second motor 22 through a combination control in which the torque control is combined with the rpm control, and the torques from the two motors can be coordinated so that they work together properly. Therefore, as can be seen from, for example, the specific example illustrated in FIG. 6, control is performed such that the output torque is not affected by the change in the difference in rotational angular velocity.

As described above, the controller 10 for a vehicle illustrated in FIG. 1 performs control so as to achieve both of the target value for the difference in rotational motion between the two motors and the target value for the output torque. For example, while the target value for the difference in rotational motion between the two motors and the target value for the output torque do not interfere with each other, control can be performed so as to follow both of these two target values. For example, by causing the difference in rotational motion between the two motors to follow the target value, the optimum rpm distribution between the two motors can be achieved, and further, by causing the output torque to follow the target value, the output torque that includes no vibration (no shock caused by a deviation from the target value) and that is highly responsive can be achieved.

Although specific embodiments of the present disclosure are described above, those embodiments are in all respects given merely by way of example and do not limit the scope of the present disclosure. The present disclosure encompasses many different modifications without departing from the spirit of this disclosure.

REFERENCE SIGNS LIST

10 CONTROLLER
12 TARGET VALUE OBTAINING SECTION
14 TORQUE COMMAND VALUE CALCULATING SECTION
20 MERGING SYSTEM
21 FIRST MOTOR
22 SECOND MOTOR
24 PLANETARY MECHANISM

The invention claimed is:

1. A controller for a vehicle, the controller being configured to control a vehicle that includes a merging system for merging torque from a first motor with torque from a second motor through a planetary mechanism to generate an output torque that is output from the merging system, the controller comprising:
   a processor programmed to:
      obtain a target value for a difference in rotational motion between the first motor and the second motor;
      obtain a target value for the output torque that is output from the merging system;
      calculate a first torque command value for the first motor and a second torque command value for the second motor that achieve both of the target value for the difference in rotational motion between the first motor and the second motor and the target value for the output torque that is output from the merging system by performing an arithmetic operation using an inverse matrix of a matrix corresponding to a motion model of the merging system based on: (a) the target value for the difference in rotational motion between the first motor and the second motor, and (b) the target value for the output torque that is output from the merging system; and
      output the calculated first torque command value to the first motor and the calculated second torque command value to the second motor such that the planetary mechanism generates the output torque that is output from the merging system.

2. The controller for a vehicle according to claim 1, wherein the motion model is obtained from one or more equations of motion corresponding to motion in the merging system.

3. The controller for a vehicle according to claim 2, wherein the motion model is a motion model for obtaining the difference in rotational motion and the output torque from the torque of the first motor and the torque of the second motor.

4. The controller for a vehicle according to claim 3, wherein an actual measurement value for the difference in rotational motion is fed back to calculate the two torque command values for the first motor and the second motor, so as to control the actual measurement value for the difference in rotational motion to follow the target value.

5. The controller for a vehicle according to claim 2, wherein an actual measurement value for the difference in rotational motion is fed back to calculate the two torque command values for the first motor and the second motor, so as to control the actual measurement value for the difference in rotational motion to follow the target value.

6. The controller for a vehicle according to claim 1, wherein the motion model is a motion model for obtaining the difference in rotational motion and the output torque from the torque of the first motor and the torque of the second motor.

7. The controller for a vehicle according to claim 6, wherein an actual measurement value for the difference in rotational motion is fed back to calculate the two torque command values for the first motor and the second motor, so as to control the actual measurement value for the difference in rotational motion to follow the target value.

8. The controller for a vehicle according to claim 1, wherein an actual measurement value for the difference in rotational motion is fed back to calculate the two torque command values for the first motor and the second motor, so as to control the actual measurement value for the difference in rotational motion to follow the target value.

* * * * *